April 30, 1957 M. S. CORRINGTON 2,790,954

TRANSIENT CORRECTING NETWORK

Filed Feb. 1, 1954

INVENTOR.

Murlan S. Corrington

BY J. L. Whittaker

ATTORNEY

United States Patent Office 2,790,954

Patented Apr. 30, 1957

2,790,954

TRANSIENT CORRECTING NETWORK

Murlan S. Corrington, Haddonfield, N. J., assignor to Radio Corporation of America, a corporation of Delaware Application February 1, 1954, Serial No. 407,286

8 Claims. (Cl. 333—20)

The present invention is related to transient correcting networks, and particularly to transient shaping networks which substantially suppress transient overshoot response.

The desirability of a network having reduced overshoot in response to applied transients is well understood in the art. In fact, circuits have been synthesized which, in theory, have no overshoot response to a transit. However, the known circuits of this type are few and are complicated in structure and cumbersome of adjustment.

It is particularly important in video systems which pass signals, of which many are steep-fronted pulses, to suppress transient overshoot and subsequent ringing in order to preserve picture quality, to prevent color blending, and to maintain proper transitions between light and dark areas and between different colors in adjacent portions of the image. Conventional circuits heretofore in use have caused excessive overshoot in passing transients.

It is an object of the invention to provide an improved means for correcting the transient response of a network, or of a systetm, by substantially eliminating transient initial overshoot and subsequent ringing.

Another object of the invention is to provide an improved means for the substantial suppression of transient overshoot and subsequent ringing in a low-pass filter network wherein it would otherwise appear.

A further object of the invention is to provide an improved low-pass filter network in which the transient overshoot and subsequent ringing which otherwise would be present is substantially suppressed.

A further object of this invention is to provide an improved low-pass filter network having a well-defined cut-off frequency together with a relatively linear phase response characteristic.

According to the invention, traps are added to a conventional minimum-phase-shift circuit having a low-pass filter characteristic and having a fairly flat amplitude response or some peaking near cutoff. Normally this type of conventional filter shows a transient overshoot in response to a unit-step function. The addition of traps to such a low-pass filter in the frequencies near cutoff, so that they place dips in the selectivity curve at the proper points, and the adjustment of the Q's of these traps, results in the substantial suppression of both transient initial overshoot and subsequent ringing. An advantageous feature of this invention is that the means for correcting transient response may be effectively used in the filter network or in some other part of the system through which the transient passes.

The foregoing and other objects and novel features of the invention will be more fully apparent from the following description when read in conjunction with the accompanying drawing in which.

*Detailed description*

Figure 1:
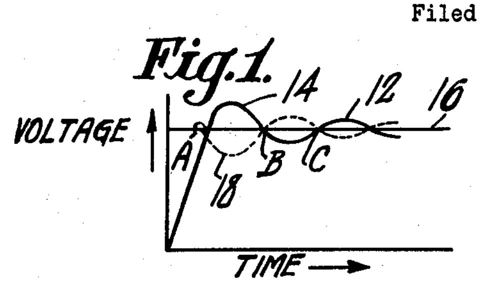
Figure 1 is a graph of the response of a network to a unit-step function.

The solid line, curve 12 of Figure 1, shows the response of a filter network to a unit-step function. There is a considerable overshoot 14 followed by an oscillation about the final steady state value 16. The initial overshoot 14 may be cancelled if a correction network, according to the invention, is included in the filter and adjusted as hereinafter described so that it will start to ring, as shown by dotted line curve 18, at just the time of the start of the original overshoot. Both the amplitude and phase of the ringing of the correction network, or trap, must be properly adjusted, as hereinafter described.

Figure 2:
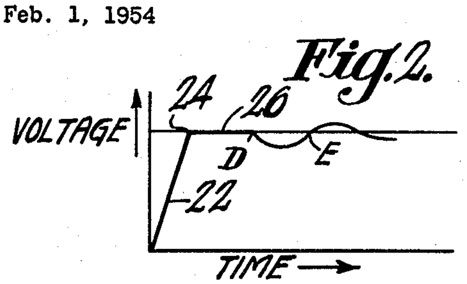
Figure 2 is a graph of the response of the network of Figure 1, corrected to cancel overshoot for a short time.

Figure 2 shows the linear rise 22 followed by the fairly sharp corner 24 which results from such a cancellation. Since a single trap cannot be expected to produce perfect cancellation of the transient overshoot for a considerable period of time the network will eventually start to ring again, as shown in Figure 2.

This process can be repeated indefinitely. A second trap can be added further to cancel part of the residual ringing of Figure 2 and to extend the flat portion 26 of the transient response farther. Theoretically an infinite number of such traps is required for perfect correction of the transient ringing, but in practice two or more traps give residual ringing of less than 1 or 2 per cent and are satisfactory. The method of accomplishing this is to be described hereinafter.

Figure 3:
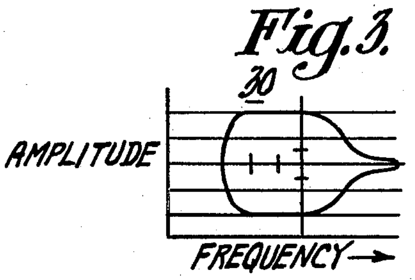
Figure 3 is an oscillogram showing the sweep frequency response of a filter network with uncorrected transient response.

Figure 3 shows the frequency response 30 of an uncompensated filter network wherein the sweep frequency increases linearly from left to right. The selectivity curve is fairly flat to cutoff and rolls off uniformly beyond cutoff.

Figure 4:
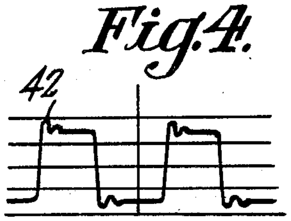
Figure 4 is an oscillogram showing the square wave response of the same filter network used to obtain the oscillogram of Figure 3.

A square wave applied to this uncompensated filter network will appear in the output with an overshoot 42 of approximately 5% as shown in Figure 4.

Figure 5:
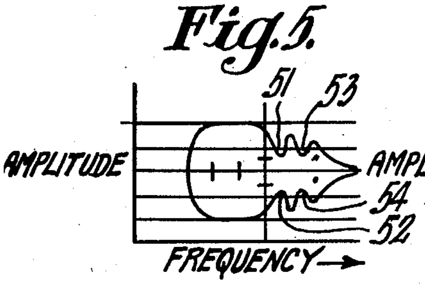
Figure 5 is an oscillogram showing the frequency response of the same filter network used to obtain the oscillogram of Figure 3, but with traps added.

Figure 5 shows the frequency response of the filter network with two additional series resonant traps set at 335 kc. and at 470 kc. respectively, but with Q's that are too high. Dips 51, 52, and 53, 54 appear at the frequencies of the two traps.

Figure 6:
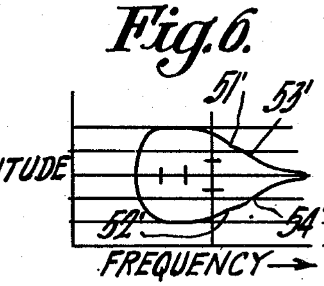
Figure 6 is an oscillogram showing the response of the filter network used to obtain the oscillogram of Figure 5, in which the Q's of the added traps have been adjusted.

When the Q's of the traps are adjusted properly the selectivity curve is shown by Figure 6 with the dips 51', 52' and 53', 54' at the trap frequencies but greatly reduced.

Figure 7:
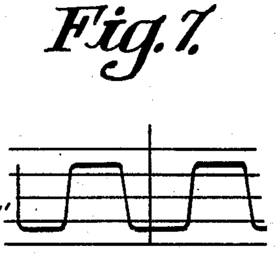
Figure 7 is an oscillogram showing the response to a 50 kc. square wave of the filter network used to obtain the oscillogram of Figure 6.

Figure 7 shows the response of the compensated filter network to a 50 kc. square wave. There is only a slight ripple left in the top of the wave. The time delay of the circuit to at least 600 kc. is as constant as can be measured.

Figure 8:
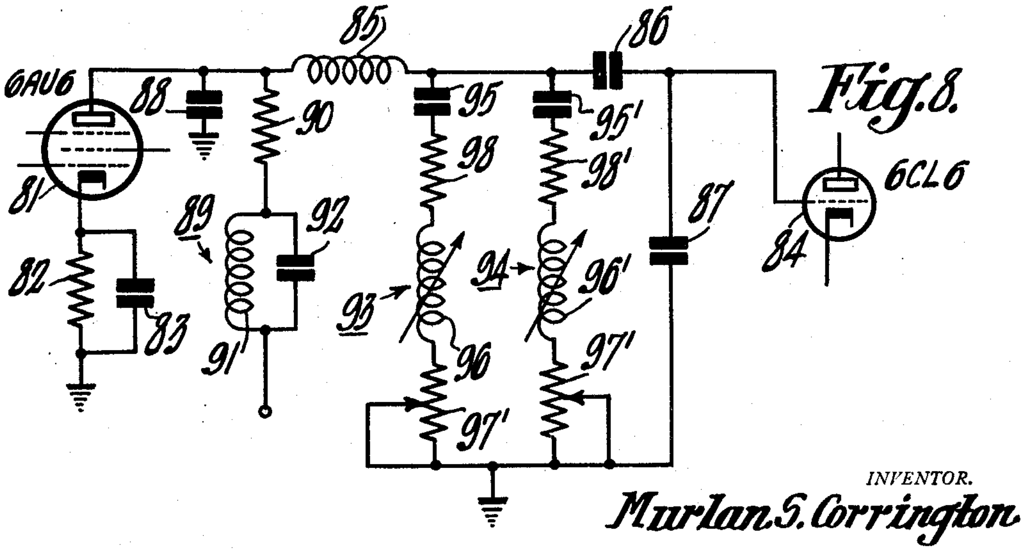
Figure 8 is a schematic circuit diagram of a stage of video amplification with series traps added.

Figure 8 shows a stage of video amplification in which a 6AU6 tube 81 is biased by the cathode resistor 82 which is bypassed by the capacitor 83. The signal voltage on the grid 84 of a 6CL6 tube is applied through the series inductor 85 and the blocking capacitor 86, and is developed across the output capacitor 87. External input capacitor 88 includes the interelectrode plate capacitance of the 6AU6 tube 81. The frequency response of the amplification stage is peaked by the shunt peaking circuit 89 which includes the resistor 90 in series with the inductor 91 which is shunted by the capacitor 92. The foregoing amplification stage with the series inductor 85 and shunt peaking circuit 89 is conventional and has the characteristics of a low-pass filter with a cutoff point at 450 kc. However, in its response to a transient it produces overshoot and ringing. In accordance with the invention, two series resonant traps 93 and 94 are inserted into the network to compensate and correct the overshoot and ringing. Each series resonant trap contains a capacitor 95 or 95' and a variable inductor 96 or 96'. Variable resistors 97 and 97' are inserted for the purpose of varying Q. Fixed series resistors 98 and 98' serve the dual purpose of limiting the maximum obtainable value of Q, and of isolating capacitors 95 and 95' from ground. Traps 93 and 94 with LC ratios and Q's adjusted as hereinafter described, are tuned to 335 kc. and 470 kc., respectively.

Actual values for the components of the stage of amplification together with the peaking circuit and low-pass filter, and for the two series resonant traps are:

| | |
|---|---|
| Resistor **82** | 180 ohms. |
| Resistor **90** | 10,000 ohms. |
| Resistor **98** | 27,000 ohms. |
| Resistor **98'** | 27,000 ohms. |
| Variable resistor **97** | 25,000 ohm potentiometer. |
| Variable resistor **97'** | 25,000 ohm potentiometer. |
| Capacitor **83** | 1000 μf. |
| Capacitor **86** | .47 μf. |
| Capacitor **87** | 39 μμf. |
| Capacitor **92** | 22 μμf. |
| Capacitor **95** | 22–27 μμf. |
| Capacitor **95'** | 22–27 μμf. |
| Capacitance **88** | 47 μμf. |
| Inductor **85** | 6.3 mh. |
| Inductor **89** | 1.9 mh. |
| Variable inductor **96** | 5 pi peaking coil with ferrite core (2–8 mh.). |
| Variable inductor **96'** | 5 pi peaking coil with ferrite core (2–8 mh.). |

*Operation*

A 50 kc. square wave applied to the network shown in Figure 8, without the series traps added, would produce an output response as shown by Figure 4, with definite transient overshoot 42 and subsequent ringing. Substantial elimination of the transient overshoot so that the square wave appears with oly a slight ripple along the top of the wave, requires the shunt addition of at least one series resonant trap. The flat portion of the top of the square wave can be extended and the corner can be made even sharper (as shown in Figure 2) by the shunt addition of a second series resonant trap. The frequencies at which the traps are to be resonant can be determined by observation of the square wave on an oscilloscope with time-calibrated horizontal deflection. The resonant frequency of the first trap is set near cutoff at a frequency such that the elapsed time of the first overshoot (from point A to point B of Figure 1) corresponds approximately to the elapsed time of one half cycle at the trap frequency. Similarly, a second trap may be tuned to a frequency near cutoff such that the elapsed time of the half cycle of ringing (between D and E as shown in Figure 2) corresponds approximately to the elapsed time of one half cycle at the frequency of the second trap. In the network shown in Figure 8, the trap frequencies are 335 kc. and 470 kc.

The amplitude of the compensating ringing wave, which is produced by the addition of a trap to the network, may be adjusted by varying the $$\frac{L}{C}$$

ratio of the trap to match the impedance of the trap to that of the network. The phase and the rate of decay of the compensating wave may be adjusted by varying the Q of the trap; this may be accomplished by adjusting the variable resistors 97, 97'. The higher the Q's are made the longer each trap will ring and exert its compensating influence. The first trap may require slight readjustment after the insertion of the second trap. This may be accomplished by readjustment of the variable inductor 96 and the potentiometer 97. The ringing frequencies are the ones which exhibit greatest gain. These are the very ones which require slight attenuation by the insertion of traps. The net result is that a filter network can be made very flat within the passband, with a very sharp cutoff, and without transient ringing.

In a color television receiver this means that it is possible to build amplifiers with a flat frequency response in each channel and thus considerably improve the picture quality.

Transient-response correcting traps may be added to any part of a system to achieve their compensating effects. They may be inserted within a transmitter or a receiver and may be arranged in the configuration taught in this invention or in the configurations, as is known in the art, of equivalent circuits, indicated in pages 271–2 of the book entitled "Transmission Circuits for Telephonic Communication" by K. S. Johnson, published in 1925 by D. Van Nostrand.

What is claimed is:

1. In a low-pass filter network of the type having approximately uniform response within its bandpass to non-transient type signals applied to said network but which overshoots and subsequently oscillates in response to transients such as steel-fronted pulses applied to said network, a circuit for compensating for said overshoot and subsequent oscillations comprising a series tuned circuit connected in shunt across said network tuned to the frequency of the first half cycle of said oscillations.

2. In a low-pass filter network of the type having approximately uniform response within its bandpass to non-transient type signals applied to said network but which overshoots and subsequently oscillates in response to transients such as steep-fronted pulses applied to said network, a circuit for compensating for said overshoot and subsequent oscillations comprising a series tuned circuit including means for adjusting the Q thereof connected in shunt across said network tuned to the frequency of the first half cycle of said oscillations.

3. In a low-pass filter network as set forth in claim 2, said means for adjusting the Q of said series tuned circuit including an adjustable resistor in said series tuned circuit.

4. In a low-pass filter network of the type having approximately uniform response within its bandpass to non-transient type signals applied to said network but which overshoots and subsequently oscillates in response to transients such as steep-fronted pulses applied to said network, a circuit for compensating for said overshoot and subsequent oscillations comprising a series tuned circuit connected in shunt across said network tuned to the frequency of the first half cycle of said oscillations, said series tuned circuit including means for adjusting the ratio of inductance to capacitance of said tuned circuit.

5. In a low-pass filter network of the type having approximately uniform response within its bandpass to non-transient type signals applied to said network but which overshoots and subsequently oscillates in response to transients such as steep-fronted pulses applied to said network, a circuit for compensating for said overshoot and subsequent oscillations comprising a series tuned circuit connected in shunt across said network tuned to the first half cycle of said oscillations, said series tuned circuit including an inductor element, a condenser element, and an adjustable resistor element.

6. In a low-pass filter network of the type having approximately uniform response within its bandpass to non-transient type signals applied to said network but which overshoots and subsequently oscillates in response to transients such as steep-fronted pulses applied to said network, a circuit for compensating for said overshoot and subsequent oscillations comprising a series tuned circuit connected in shunt across said network tuned to the frequency of the first half cycle of said oscillations, said series tuned circuit including an adjustable lumped inductor element, a lumped capacitor element, and an adjustable resistor element.

7. In a low-pass filter network of the type having approximately uniform response within its bandpass to non-transient type signals applied to said network but which overshoots and subsequently oscillates in response to transients such as steep-fronted pulses applied to said network, a circuit for substantially eliminating said overshoot and subsequent oscillations comprising a plurality of tuned circuits connected in shunt across said network, each said tuned circuit including an inductor element, a condenser element and an adjustable resistor element, the first of said tuned circuits being tuned to the frequency of the first half cycle of said oscillations, the second of said tuned circuits being tuned to the frequency of the second half cycle of said oscillations, and each of the remaining of said tuned circuits being tuned to the frequency of a different other half cycle of said oscillations.

8. In a low-pass filter network as set forth in claim 7, said inductor element in each tuned circuit being an adjustable inductor element.

References Cited in the file of this patent

UNITED STATES PATENTS

| | | |
|---|---|---|
| 2,247,898 | Wheeler | July 1, 1941 |
| 2,461,321 | Guillemin | Feb. 8, 1949 |
| 2,465,407 | Varela | Mar. 29, 1949 |